United States Patent [19]

Ara et al.

[11] Patent Number: 4,999,770
[45] Date of Patent: Mar. 12, 1991

[54] COMMAND CONTROLLED MULTI-STORAGE SPACE PROTECTION KEY PRETESTING SYSTEM PERMITTING ACCESS REGARDLESS OF TEST RESULT IF SELECTED KEY IS PREDETERMINED VALUE

[75] Inventors: Mari Ara, Isehara; Hideo Sawamoto, Hadano; Kaname Imai, Hadano, all of Japan

[73] Assignee: Hitachi, Ltd., Tokyo, Japan

[21] Appl. No.: 84,092

[22] Filed: Aug. 11, 1987

[30] Foreign Application Priority Data

Sep. 19, 1986 [JP] Japan .................. 61-221366

[51] Int. Cl.⁵ .................. G06F 12/14; G06F 12/10
[52] U.S. Cl. .................. 364/200; 364/246.6; 364/255.7; 364/255.1; 364/247; 364/259; 364/259.2; 364/265; 364/247.2; 364/969; 364/971; 364/963; 364/963.3; 364/955; 364/955.5
[58] Field of Search ... 364/200MS File, 900 MS File, 364/188; 379/191

[56] References Cited

U.S. PATENT DOCUMENTS

| | | | |
|---|---|---|---|
| 3,264,615 | 8/1966 | Case et al. | 364/200 |
| 3,328,765 | 6/1967 | Amdahl et al. | 364/200 |
| 3,328,768 | 6/1967 | Amdahl et al. | 364/200 |
| 3,573,855 | 4/1971 | Cragon | 364/200 |
| 3,576,544 | 4/1971 | Cordero | 364/200 |
| 3,742,458 | 6/1973 | Inoue | 364/200 |
| 3,825,903 | 7/1974 | Brown | 364/200 |
| 3,947,823 | 3/1976 | Padegs | 364/200 |
| 4,037,214 | 7/1977 | Birney et al. | 364/200 |
| 4,038,645 | 7/1977 | Birney et al. | 364/200 |
| 4,099,243 | 7/1978 | Palumbo | 364/200 |
| 4,136,385 | 1/1979 | Gannon | 364/200 |
| 4,355,355 | 10/1982 | Butwell | 364/200 |
| 4,366,537 | 12/1982 | Heller et al. | 364/200 |
| 4,430,705 | 2/1984 | Cannavino et al. | 364/200 |
| 4,439,830 | 3/1984 | Chueh | 364/200 |
| 4,472,790 | 9/1984 | Burk et al. | 364/900 |
| 4,500,952 | 2/1985 | Heller | 364/200 |
| 4,521,846 | 6/1985 | Scalzi et al. | 364/200 |
| 4,589,064 | 5/1986 | Chiba et al. | 364/200 |
| 4,669,043 | 5/1987 | Kaplinsky | 364/200 |
| 4,733,344 | 3/1988 | Watanabe et al. | 364/200 |
| 4,961,139 | 10/1990 | Hong | 364/200 |

FOREIGN PATENT DOCUMENTS 0115877  8/1984  European Pat. Off.
57-8660A  1/1982  Japan

OTHER PUBLICATIONS

The HITAC5020 Time Sharing System, Proc. 24th ACM National Conference, 1969, pp. 419-429.

*Primary Examiner*—David Y. Eng
*Assistant Examiner*—Eric Coleman
*Attorney, Agent, or Firm*—Antonelli, Terry, Stout & Kraus

[57] ABSTRACT

A multi-address space control for use in a information processing system includes accessing a plurality of address spaces produced by different address translation table based on a selection command for a plurality of first address registers, and comparing a program status word key with a main storage key in a main storage to protect the main storage. The multi-address space control between different address spaces includes a PSW key register for holding the program status word key, a work access key register capable of arbitrarily designating an access key in accordance with a data transfer instruction, access apparatus for allowing an access to the main storage irrespective of the value of a main storage key when the value of the key selected by a selector as an access key from the work access key register and the PSW key register is a predetermined value, and setting apparatus for accessing the different address spaces by changing-over the plurality of leading address registers and the work access key register and PSW register, detecting an access exception, and setting the predetermined value in the work access key register to judge the work access key as an access key if an access exception is not detected.

12 Claims, 6 Drawing Sheets

COMMAND CONTROLLED MULTI-STORAGE SPACE PROTECTION KEY PRETESTING SYSTEM PERMITTING ACCESS REGARDLESS OF TEST RESULT IF SELECTED KEY IS PREDETERMINED VALUE

BACKGROUND OF THE INVENTION

The present invention relates to multi-address space control and more particularly to a multi-address space control method and system suitable for the transfer of data between different address spaces.

As the instructions for the data transfer between two virtual address spaces (herein called first space and second space) produced by different address translation tables, there are known, for example, MVCP (Move to Primary) and MVCS (Move to Secondary) instructions as disclosed in IBM System/370 Principles of Operation GA22-7000-8. An MVCS instruction will be explained in the following:

With an MVCS instruction, data in the first space is transferred to the second space. For accessing the first space, a storage protect check is executed using a program status word (PSW) key. For accessing the second space, a key-controlled protection check is executed using a second space access protection key (called hereinafter a second space key) in a general register (GR) designated by an instruction operand.

An MVCS instruction in conventional systems has been processed as in the following:

According to a first scheme in conventional systems, at the step of accessing the second space, address translation is conducted by changing the contents of an address translation table leading address (hereinafter called a segment table origin (STO)) register which contains the first address (leading address) of an address translation table.

After a real address for the second operand address of the first space is obtained, a real address for the first operand address of the second space is obtained using the above-described second space access step. Using the obtained real address, a data transfer from the first to the second space is performed.

However, if an operand address designates a plurality of pages, it is necessary that the operand address be translated into a real address for each page and that an access exception be checked for each page if it is detected or not. The access exception includes a translation designation exception, segment translation exception, page translation exception, addressing exception, key control protection exception, page protection exception, lower address protection exception and no implemented memory. Further, it is necessary to store a logical address for notifying of an access interruption when an access exception is detected or a program event is to be interrupted, thus resulting in complicated processing.

According to a second scheme in conventional systems, second operand data in the first space are sequentially read and temporarily stored in a hardware work area. The second space access step described in the above first scheme is executed and thereafter, the data in the work area are sequentially written in the second space. However, a work area having as large a space as the data length to be transferred is required. Further, the transfer operation of operand data is not executed through repetition of second-operand read operation and first-operand write operation so that the processing speed is lowered in some cases.

In both first and second schemes, a PSW key is changed to a second space key to access the second space for storage protection check. Further, if an interruption occurs during data transfer, it is necessary to immediately set the contents of the address translation table top address at an initial value. Particularly for processing an MVCP or MVCK instruction, when an interruption occurs in both schemes while a PSW key is changed to a second space key, it is necessary to immediately set the program status word at an initial value. Furthermore, it is necessary to change a program status word every time a different address space is accessed, thereby resulting in complicated processing and low processing speed.

Schemes of this type are disclosed, for example, in JP-A-57-8860, and U.S. Pat. No. 4,521,846 (JP-B-60-41379).

SUMMARY OF THE INVENTION

It is an object of the present invention to provide a multi-address space control method and system, for use in processing data transfer between different address spaces, capable of reducing the number of steps of protection key processing to enable a high speed data transfer.

It is another object of the present invention to provide multi-address space control obviating the necessity of changing a program status word key while accessing a different address space.

According to one aspect of the present invention, there is provided a multi-address space control system for use in an information processing system for accessing a plurality of address spaces generated by different address translation tables based on a selection command for a plurality of leading first address registers, and comparing a program status word key with a storage key in the main storage to protect the main storage, the multi-address space control system including: a PWS key register for the program status word (PSW), a work access key register capable of arbitrarily designating an access key, apparatus for allowing an access to the main storage irrespective of a storage key value when the value of an access key selected from the two keys of the access, key registers is a predetermined value (K = 0), or pretest rehearsal enabling apparatus for accessing the different address spaces by changing the plurality of leading address registers and the two access key registers, detecting an access exception, and if an access exception is not detected, setting the predetermined value in the work access key register, and selector apparatus for selecting the work access key register value as an access key and allowing data transfer between different address spaces.

According to an operational aspect of this invention, STOs for the first and second spaces are set in the PWS key register and the work access key register, respectively. Microprograms or suitable hardware is so constructed such that the PWS key register and the work access key register are selected as STOs for the cases of accessing the first and second spaces, respectively, to change a space.

An arbitrary access key value can be set as desired in a work access key register provided independently from a PSW key register. The selection of one of the PSW key and the work access key can be instructed by a selector to check storage protection.

As a result, it is not necessary to change the STO register and the PSW key independently of whether an access to the first or the second space is intended.

DESCRIPTION OF THE PREFERRED EMBODIMENTS

Embodiments of the present invention will be described in detail with reference to the accompanying drawings.

Figure 1:
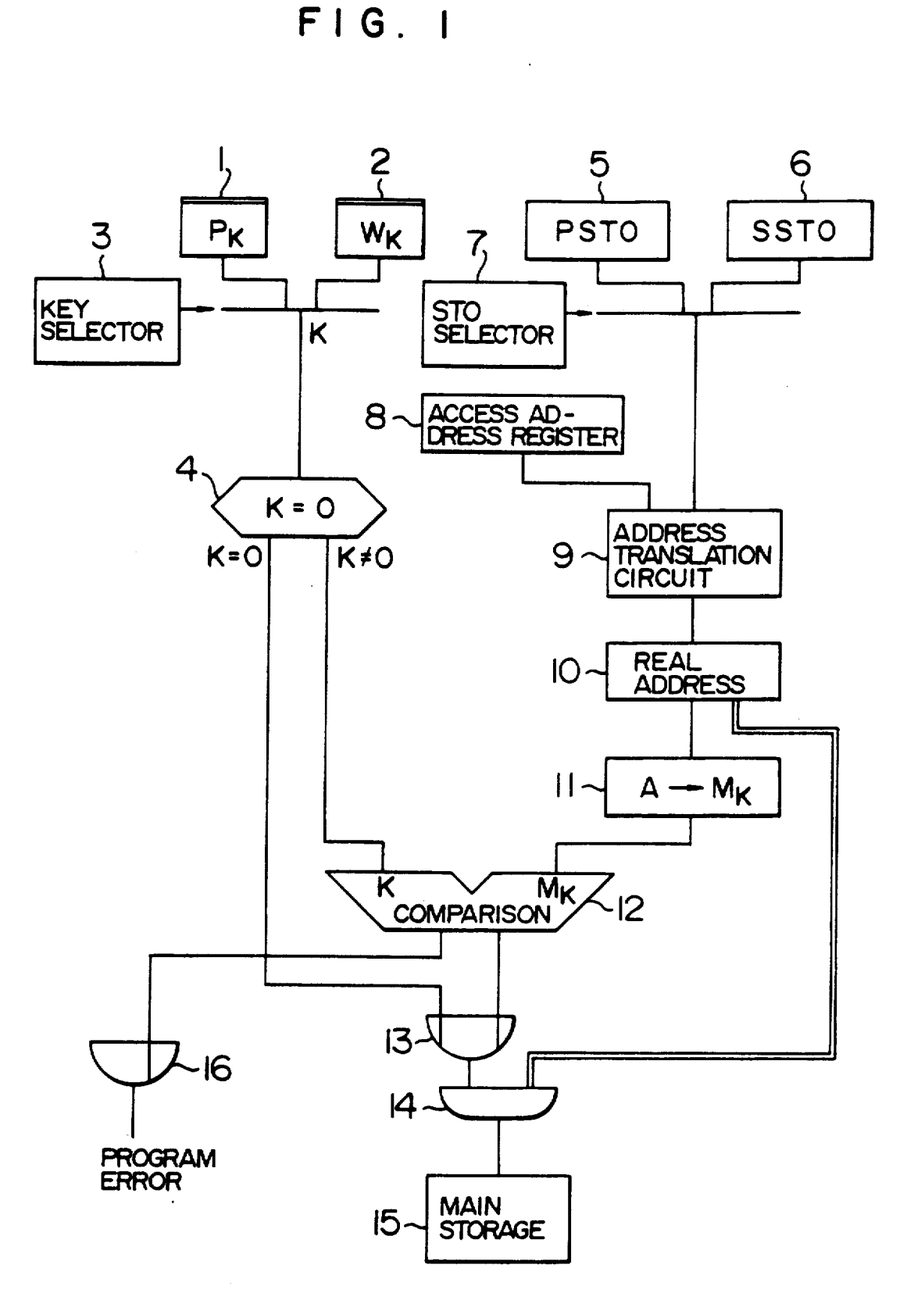
FIG. 1 is a block diagram showing an embodiment of a data processing system according to the present invention.

FIG. 1 is a block diagram showing an embodiment of a data processing system according to the present invention.

In the Figure, a single program status word (PSW) present in a central processing unit includes a PSW key which is registered in a PSW key register 1 (PSW key is called "$P_k$"). A work access key register (work access key is called "$W_k$") is provided independently from the PSW key register 1. A key selector 3 selects, under microprogram control, one of the PSW key register 1 and the work access key register 2. A judgement circuit 4 judges if a key from the key registers selected by the key selector 3 is "0" or not. There are also provided a first address translation table leading address register 5 for storing the first address of the first address translation table (called a "PSTO") and a second address translation table leading address register 6 for storing the first address of the second address translation table (called an "SSTO"). An STO selector 7 selects one of PSTO 5 and SSTO 6. A logical address register 8 loads a logical address of a main storage 15 to be accessed. An address translation circuit 9 translates a logical address in the logical address register 8 into a real address. A real address output circuit 10 controls the output of the address translation circuit 9 to provide a real address. A read circuit 11 reads a storage key $M_k$ corresponding to an address outputted from the real address output circuit 10. A comparator circuit 12 compares a main storage key $M_k$ read by the read circuit 11 with a selected key K (not zero). An access enable signal generator 13 generates an access enable signal. Upon reception of an access enable signal from the access enable signal generator 13, a main storage access circuit 14 accesses a main storage 15 storing various data, based on address data from the real address output circuit 10. An error notification circuit 16 sends to a hierarchical unit (not shown) a program error signal when the comparator circuit 12 outputs a non-coincidence result.

Figure 2:
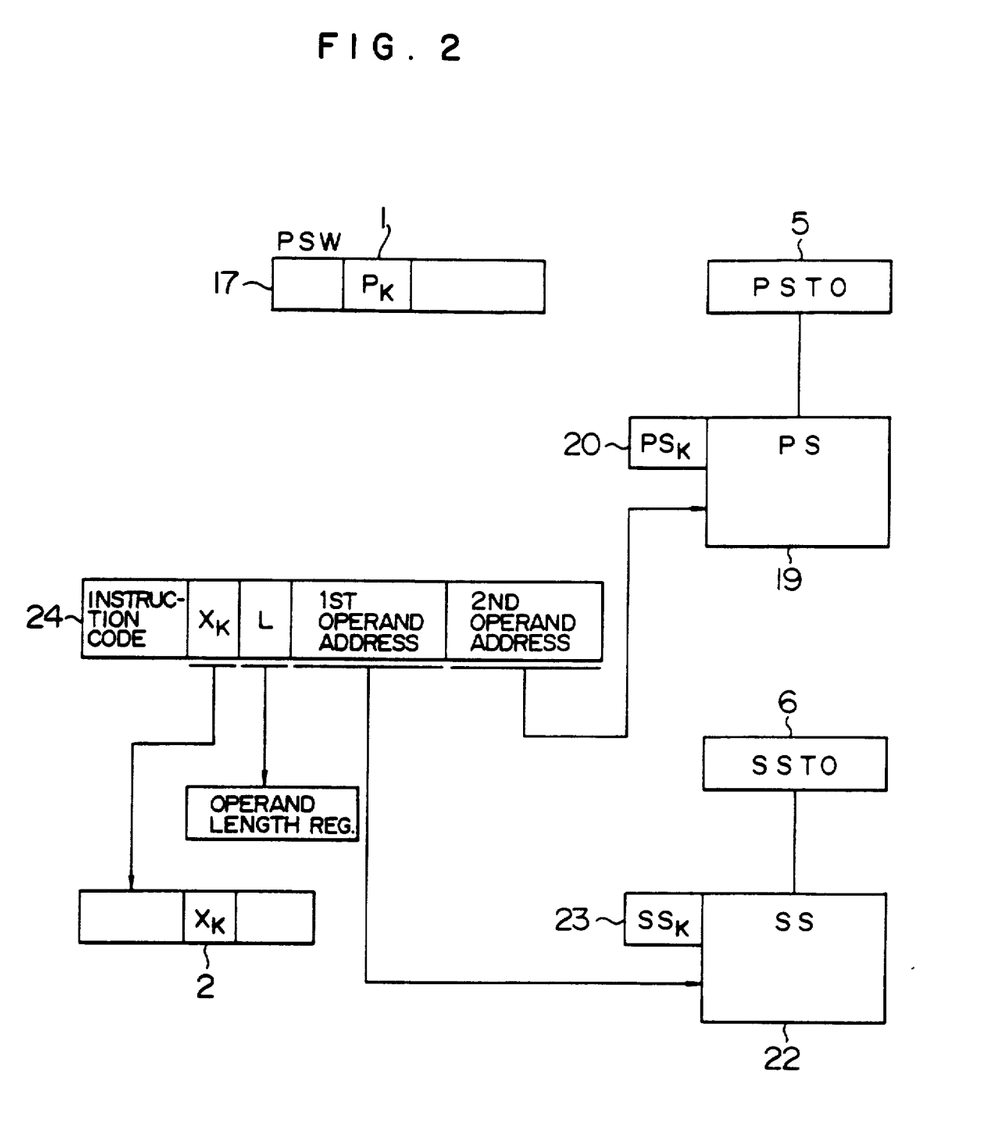
FIG. 2 shows where keys for managing main storage protection are located.

FIG. 2 is a schematic diagram showing where keys for managing main storage protection are located, wherein identical numbers to those in FIG. 1 represent similar elements and parts.

Referring to FIG. 2, there are shown a program status word 17, a first address space 19 (PS) produced by PSTO 5, a main storage key 20 ($PS_k$) corresponding to a first address space 19, a second address space 22 (SS) produced by SSTO 6, a main storage key 23 ($SS_k$) corresponding to SSTO 6, and an instruction format 24 (hereinafter called "instruction"). Each data is stored in a register or a memory.

In the embodiment shown in FIG. 2, the specification of a data transfer instruction 24 is as follows:

"A second operand on the first address space 19 is read or fetched using a PSW key $P_k$, to thereafter write i.e., store a key value $X_k$ given by the instruction as an access key K in the second address space 22 different from the first address space. The lengths of first and second operands are both L bytes. When the access key K and a storage key $M_k$ do not coincide with each other and the access key K is not "0", a program error is detected and a data transfer instruction is suppressed."

In this embodiment, it is assumed that an address translation table leading address for use in producing a first address space 19 (PS) and that for a second address space 22 (SS) are stored beforehand in PSTO 5 and SSTO 6, respectively.

Figure 3:
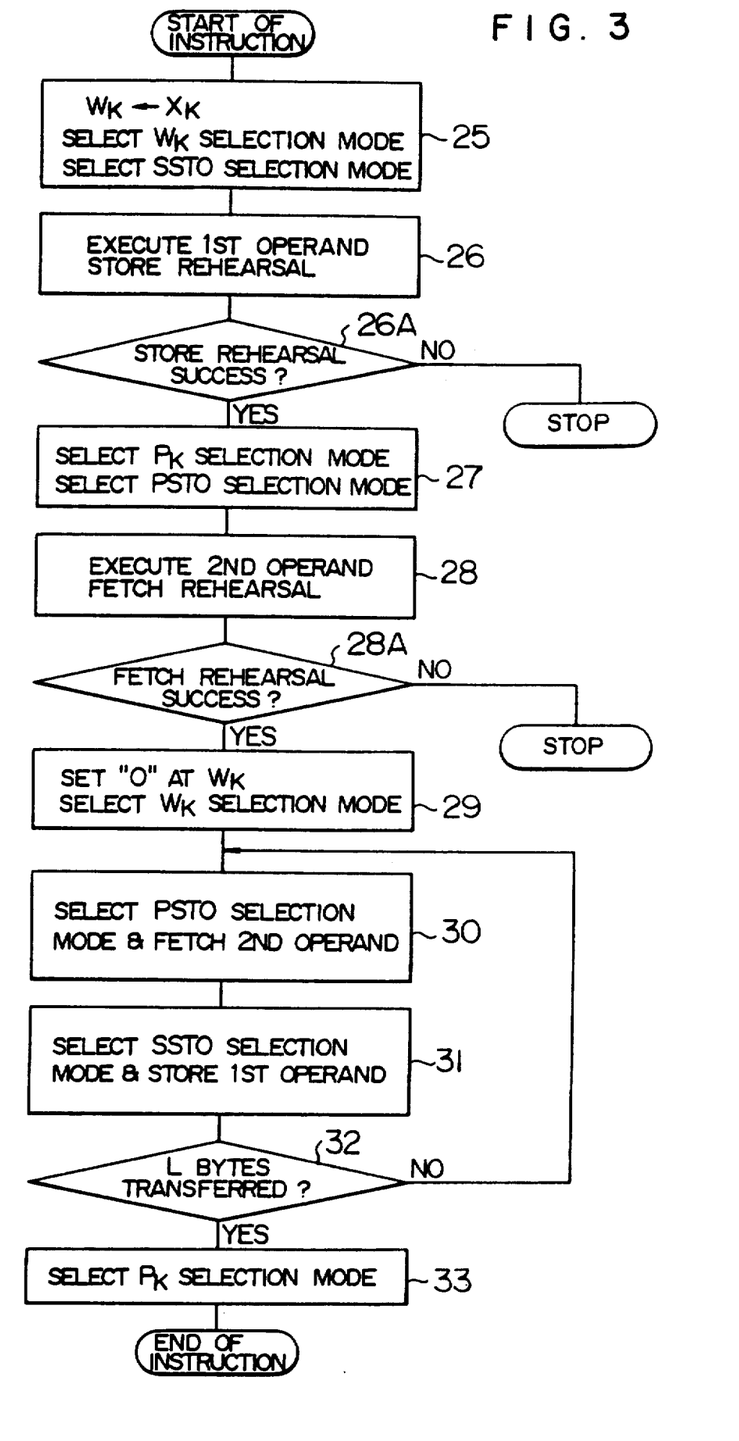
FIG. 3 is a flow chart showing the processing for a data transfer instruction between different address spaces.

FIG. 3 is a flow chart showing processings executed by microprograms or the like, of a data transfer instruction between different address spaces. The data transfer operation between different address spaces will be described using the instruction 24 shown in FIG. 2 as an example, with reference to FIG. 1 and the procedure shown in FIG. 3.

(i) A store rehearsal or pretest is first prepared to judge if a program error will be detected while a first operand is stored. A key value $X_k$ supplied from the instruction 24 on the CPU side is set in the work access key register 2, and an output selection command for the work access key register 2 is given to the key selector 3. In the following, a key selected by the key selector 3 using a key value $X_k$ is referred to as "K". A first operand address generated from the instruction 24 is set in the logical address register 8 as an address to be accessed. The first operand is located in the second space 22 (SS) generated through address translation using SSTO 6 as the first address or leading address of an address translation table (hereinafter called "STO"), and accordingly, the STO selector 7 is caused to select SSTO 6 as an STO (step 25).

(ii) A store rehearsal or pretest for the first operand is executed. The first operand address (the logical address) set at the access logical address register 8 is translated into a real address 10 by the address translation circuit 9. The corresponding storage key or space 23 ($SS_k$) added to the second address space 22 is read by the read circuit 11. In the meantime, the judgement circuit 4 judges if a key K ($= X_k$) selected by the key selector 3 is "0" or not. If the judgement results in K = 0, the main storage key $M_k$, i.e., $SS_k$ is not compared with the access key K, to allow an access to the main storage 15. K = 0, accordingly, represents a so-called "almighty key" which allows an access to the main storage 15 arbitrarily without any requirements. If the access key K selected by the selection circuit 3 is not "0", the comparator circuit 12 compares the access key K with the storage key $M_k$ read by the read circuit 11. If a comparison result by the comparator circuit 12 shows $K = M_k$, i.e., $X_k = SS_k$, then an access enable signal is generated which is applied via the access enable signal gate 13 and the main storage access circuit 14 to the main storage 15 for the access thereof. Since the store rehearsal or pretest is executed at this time, the access circuit 14 is controlled by microprograms to prevent writing into the main storage 15. If K does not match $M_k$, i.e., $X_k$ is not equal to $SS_k$, the comparator circuit 12 generates and sends a program error signal to the error notification circuit 16 (steps 26 and 26A). In this case, the processing terminates as an abnormal state.

(iii) For the preparation of a fetch rehearsal or pretest, the access key value $X_k$ supplied from the instruction 24 is set in the $W_k$ register 2. The key selector 3 is given a selection command for selecting an output from the PSW key ($P_k$) register 1. Since a second operand is located in the first address space 19 (PS) generated through address translation using PSTO 5 as the address translation table leading address, the STO selector 7 is controlled, for example, through execution of microprograms to select PSTO 5 (step 27).

(iv) Similarly to the above step (ii), a fetch rehearsal for the second operand is executed. If a access key $K=P_k$ (PSW key) selected by the key selector 3 is "0", a success of a fetch rehearsal is assumed. If K is not "0" and coincides with the storage key or 20 ($PS_k$) added to the first address space 19 (PS), i.e., $K=PS_k$, an access to the main storage 15 is possible so that a success of a fetch rehearsal or pretest is assumed.

If K is not "0" and does not coincide with $M_k$, i.e., $P_k$ is not $PS_k$, a program error is assumed to suppress the instruction (steps 28 and 28A). In case of instruction suppression, the processing is terminated as an abnormal state.

(v) After a success of a fetch rehearsal or pretest, $W_k=0$ is set in the $W_k$ register 2, and a selection command for the work access key is given to the key selector 3 (step 29).

(vi) A process for reading an operand data from the first address space 19 and writing it to the second address space 22 is performed. A selection command for an STO issues simultaneously with a main storage access request. Microprograms give an access instruction to PSTO 5 to be selected as an STO when the data is fetched from the first address space 19, and give an access instruction to SSTO 6 to be selected as an STO when the data is stored in the second address space 22. Although the storage key is read, comparison of the storage key with the access key is not effected because the access key is "0". Thus, irrespective of the value of the storage key, an access to the storage is allowed (steps 30, 31).

(vii) It is judged if the data transfer between the first and second address spaces has been completed up to L bytes. The above step (vi) is repeated until the transfer up to L bytes is completed (step 32).

(viii) After the end of data transfer processing, a selection command for the PSW key $P_k$ is given to the key selector 3 to resume a status before execution of an instruction (step 33).

(ix) If a program error is detected, the operation is set at an output selection mode for the PSW key register to initiate an interruption process.

In the similar manner as above, the present invention is applicable to an MVCP or an MVCK instruction.

According to the specification of an MVCP instruction, a second operand in the second address space is read using the key value $X_k$ supplied from the instruction, and is written into a first-operand address in the first address space using the PSW key $P_k$ as the access key. The lengths of the first and second operands are both L bytes. When the access key K is not "0" and does not coincide with the main storage key $M_k$, a program error is detected and the instruction is suppressed.

Figure 4:
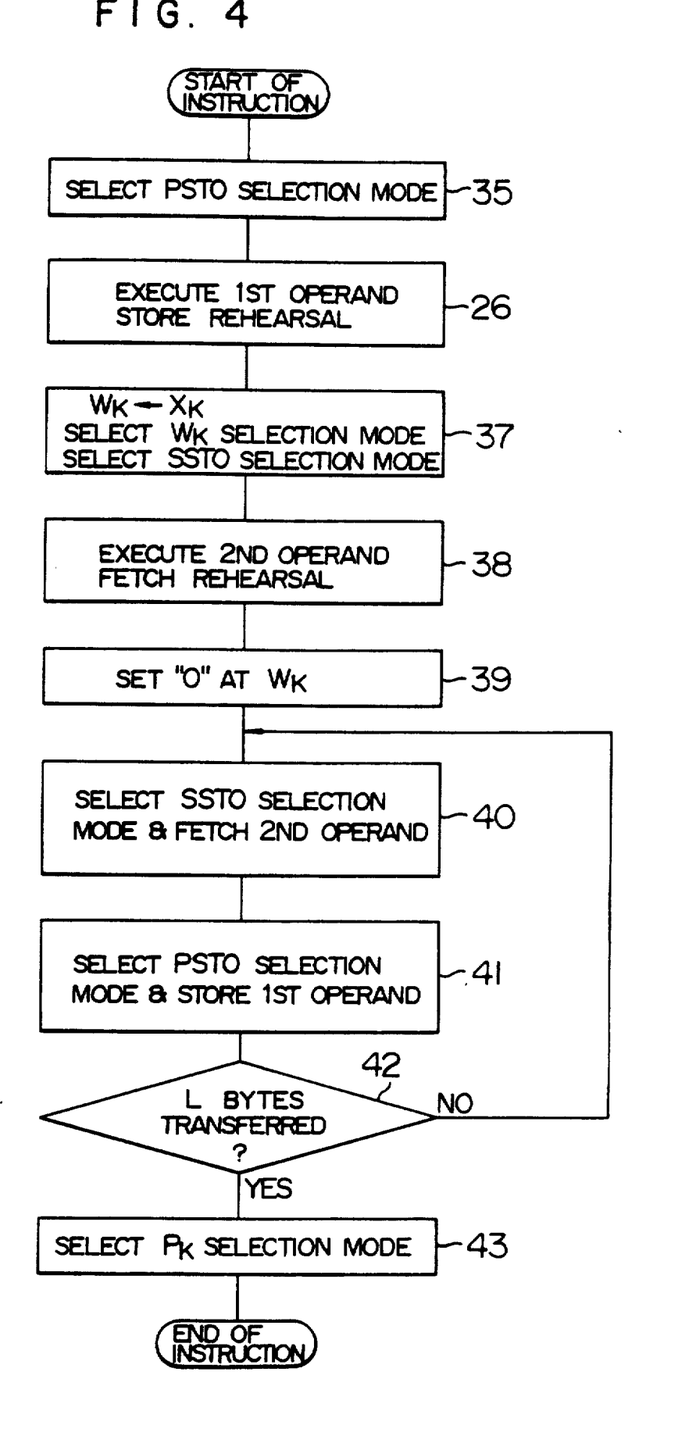
FIG. 4 is a flow chart showing another embodiment of the processing for an MVCP instruction according to the present invention.

FIG. 4 is a flow chart showing an example of data transfer by an MVCP instruction. In a store operation for a first operand in the second address space 22 (SS), PSTO register 5 is set at a selection mode (step 35) to effect a store rehearsal or pretest for the first operand (step 36). Next, the key selector 3 is set at a selection mode for the $W_k$ register 2 in which a key value $X_k$ given by the MVCP instruction has been set. The STO selector 7 is set so as to select the SSTO register 6 (step 37). Thereafter, a fetch rehearsal pretest for a second operand is conducted (step 38). Upon success of a fetch rehearsal pretest, the $W_k$ register 2 is set "0" (step 39). A processing of fetching data from the second address space 22 in the SSTO selection mode and storing it in the first address space 19 in the PSTO selection mode is performed (steps 40, 41). The following operation is identical to steps 32 and 33 of the embodiment described before.

Figure 5:
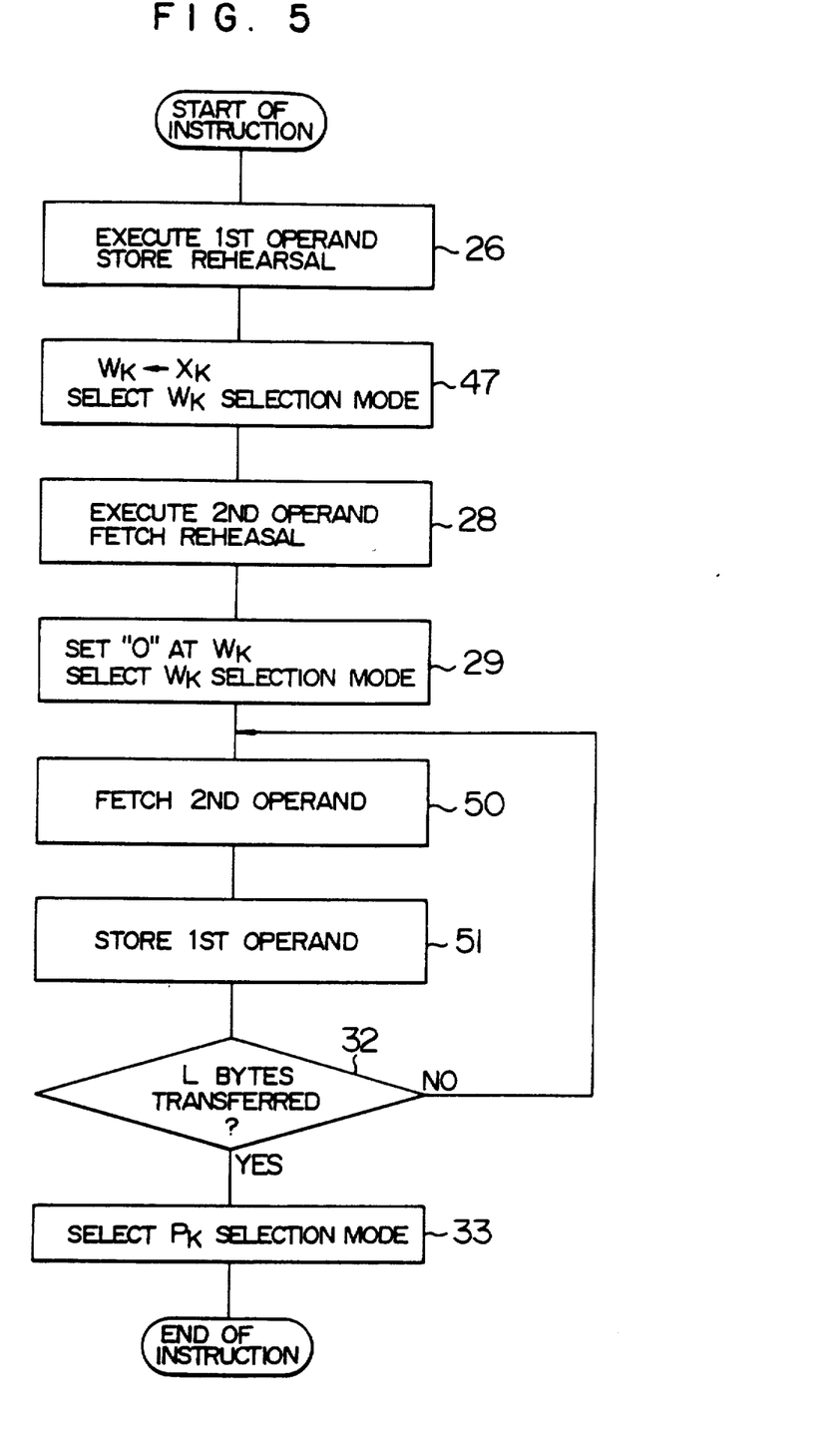
FIG. 5 is a flow chart showing another embodiment of the processing for an MVCK instruction.

FIG. 5 is a flow chart showing an embodiment of the present invention to which an MVCK instruction is applied. Similar steps to those of the preceding embodiment are designated by same reference numbers.

The specification of an MVCK instruction can be decided as in the following: A second operand is read using the key value $X_k$ supplied from an MVCK instruction. The PSW key $P_k$ is written in as an access key K at the first operand address. The lengths of the first and second operands are both L bytes. If K is not "0" and does not coincide with $M_k$, a program error is detected and the MVCK instruction is suppressed to be executed.

Particularly, with an MVCK instruction, an STO is selected in accordance with an address space control bit in the PSW. $W_k$ is used as an access key for fetching a second operand, while the PSW key $P_k$ is used as an access key for storing a first operand. Consequently, selection modes for PSTO and SSTO as in the embodiments described before are not needed as illustrated in steps 47, 50 and 51.

Figure 6A:
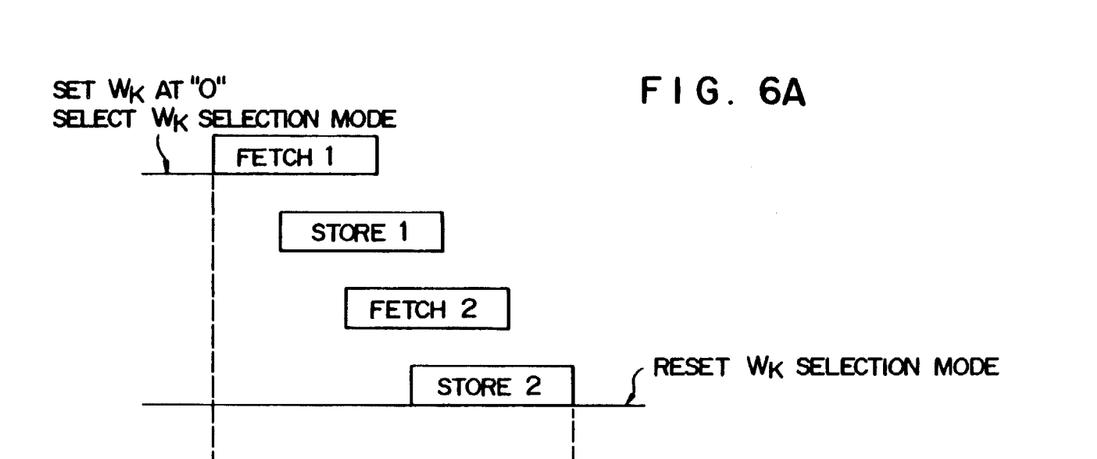
FIGS. 6A and 6B are diagrams for explaining the difference between the present invention and a conventional system.
Figure 6B:
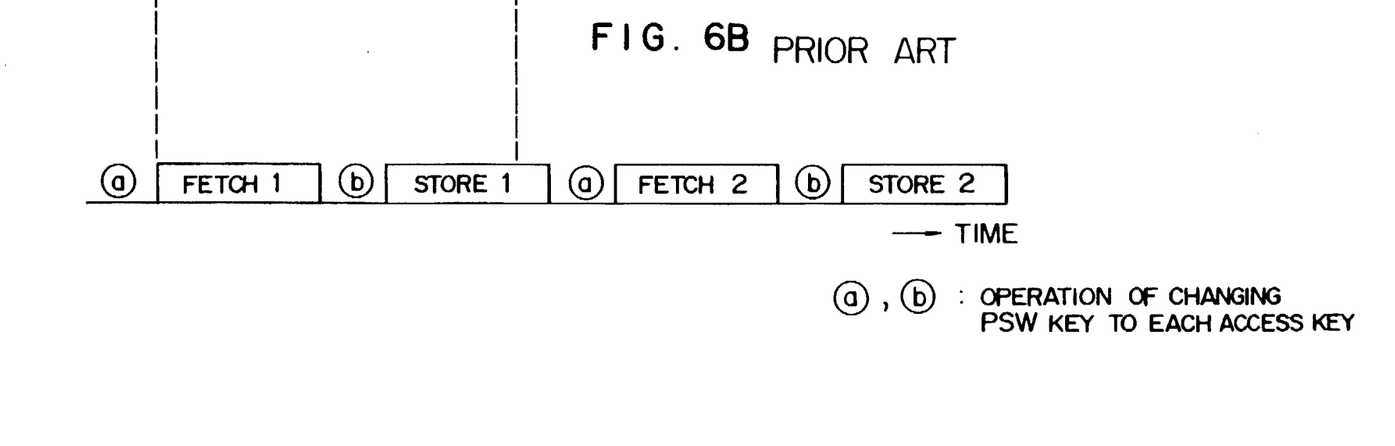

Data transfer according to the present invention and a prior art will be compared with reference to the timing charts shown in FIGS. 6A and 6B.

In the case where a request address is given by a logical address, the following operations are generally performed for each fetch (or store):

(1) recognizing a request address,
(2) judging if the request address is present in a translation lookaside buffer (TLB),
(3) deriving a real address from the TLB if the request address is present in it,
(4) deriving a real address through address translation if the request address is not present in the TLB, and
(5) fetching (or storing) data from (or into) a storage or a cashe memory at the real address using an access key.

If the same access key K is used to repeat a request, the above operations can be generally executed in an overlap manner.

FIG. 6A shows a timing chart of a read/write operation using the same access key. In the Figure, fetch and store operations are executed in an overlap manner, which are realized through a pipeline processing of the above operations (1) to (5).

However, in transferring data between address spaces by different access keys, an access key value $X_k$ different for each request must be used. In such a case, the access key value K must be maintained unchanged until the above operation (5) is completed. Therefore, a request has been processed heretofore serially as shown in FIG. 6B by way of the operations a and b by which a PSW key is changed to a corresponding address space key.

In contrast with the above, in the embodiments according to the present invention, K=0, i.e., almighty access is used in data transfer between address spaces even if they have different keys. Therefore, the data transfer between address spaces is performed using an apparently same access key, thus enabling an overlap among the accesses as shown in FIG. 6A and a high speed data transfer.

The following advantages are included in the embodiments of this invention:

A main storage can be accessed while satisfying main storage protection and not changing a PSW key of the CPU. Thus, complicated processing of changing a PSW can be omitted.

In transferring data between main storages having different main storage keys, a key protection exception can be suppressed by selecting a work access key selection mode and setting the work access key "0", to thereby allow accessing by the same access key and thus enable a high speed data transfer.

Since an address space can be changed easily, there is no need of changing an STO, thus enabling a high speed data transfer between address spaces.

We claim:

1. A data processing system for multi-address space control wherein when a main storage is to be accessed from a processor, a main storage protection is conducted by comparing by a comparator an access key output by said processor with a main storage key provided in the main storage, comprising:
   a first key register for storing a program status word key output by said processor;
   a second key register for storing an access key output by said processor in accordance with a data transfer instruction;
   a selector for selecting one of said first and second key register under control of said processor independently from storage access type;
   judging means coupled to said selector for judging whether a key selected by said selector is a predetermined value, allowing said processor to access said main storage irrespective of a value of said main storage key when the value of said selected key matches said predetermined value, and for comparing the value of said selected key to said main storage key; and
   pretesting means including a microprogram for executing a predetermined pretesting procedure, for setting said predetermined value in said second key register as a key for pretesting a data transfer between a plurality of address spaces when a key included in a transfer instruction coincides with said main storage key.

2. In an information processing apparatus wherein a plurality of address spaces produced by a plurality of address translation tables based on a selection command for a plurality of first address registers for holding first addresses of said plurality of address translation tables are accessed, and a program status word key and a storage key are compared by a comparator to protect a main storage,
   a multi-address space control system comprising:
   a first key register for holding said program status word key;
   a second key register for holding a work access key output by a processor in accordance with an instruction to be executed;
   a key selector for selecting one of said first and second key registers under control of said processor independently of storage access type;
   judging means coupled to the output of said key selector for judging whether the value of a key from said first key register or said second key register is a predetermined value, and allowing said processor to access said main storage irrespective of the output from said comparator when said key selected by said key selector is equal to said predetermined value; and
   pretesting means for pretesting access of address spaces by selecting one of said plurality of first address registers, and said first and second key registers, detecting an access exception, and storing, in response to an output from said comparator that an access exception is not detected, said predetermined value in said second key register as a key for use in transferring data between different address spaces.

3. A system according to claim 2, wherein said instruction is a data transfer instruction having first and second operands, wherein one of said first and second operands is fetched and stored into an operand address, a key for said one of first and second operands is designated by said program status word key and a key for the other of the first and second operands is designated by said data transfer instruction.

4. A system according to claim 3, wherein said key selector selects one of said first and second key registers under control of a microprogram associated with said data transfer instruction.

5. A system according to claim 2, wherein said first key register holds key for detecting an access exception for one of first and second operands and said second key register holds a key given by a data transfer instruction as a key for detecting an access exception for the other of said first and second operands.

6. A system according to claim 2, wherein said second key register holds a key by which access to said main storage is permitted for transferring first and second operands of a predetermined until length through repetitive fetch and store operations.

7. A multi-address space control method for use in an information processing apparatus wherein a plurality of address spaces produced by a plurality of address translation tables based on a selection command for a plurality of first address registers for holding first addresses of said plurality of address translation tables are accessed, and a program status word key and a storage key are compared by a comparator to protect a main storage,
   said multi-address space control method comprising the steps of:
   (a) holding a first key register said program status word key;
   (b) holding in a second key register a work access key output by a processor in accordance with an instruction to be executed;

(c) selecting by a key selector, one of said first and second key registers under control of said processor independently of storage access type;

(d) judging whether the value of a key from said first key register or said second key register is a predetermined value, and allowing said processor to access said main storage irrespective of the output from said comparator when said key selected by said key selector is equal to said predetermined value; and (e) pretesting access of address spaces by selecting one of said plurality of first address registers, and said first and second key registers, detecting an access exception, and storing in response to an output from said comparator that an access exception is not detected, said predetermined value in said second key register as a key for use in transferring data between different address spaces.

8. A method according to claim 7, wherein said instruction is a data transfer instruction having first and second operands, wherein one of said first and second operands is fetched and stored into an operand address, a key for said one of first and second operands is designated by said program status word key and a key for the other of the first and second operands is designated by said data transfer instruction.

9. A method according to claim 7, wherein said step (b) comprises the steps of:
holding in said second key register a key, by which access to said main storage is permitted, for transferring first and second operands of a predetermined until length through repetitive fetch and store operations.

10. A method according to claim 8, wherein said step (c) comprises the steps of:
selecting, by said key selector selects one of said first and second key registers under control of a microprogram associated with said data transfer instruction.

11. A method according to claim 7, wherein said step (a) comprises the steps of:
holding in said fist key register a key for detecting an access exception for one of first and second operands; and
holding in said second key register a key given by a data transfer instruction as a key for detecting an access exception for the other of said first and second operands.

12. A method according to claim 7, wherein said step (e) includes a store pretesting step for pretesting an address space to which data is to be transferred and a fetch pretesting step for pretesting an address space from which data is to be transferred.

* * * * *